Oct. 11, 1966     J. E. ALLEN ET AL     3,277,767
QUICK RELEASE PIN WITH RIGIDLY ATTACHED HANDLE
Filed Aug. 3, 1964
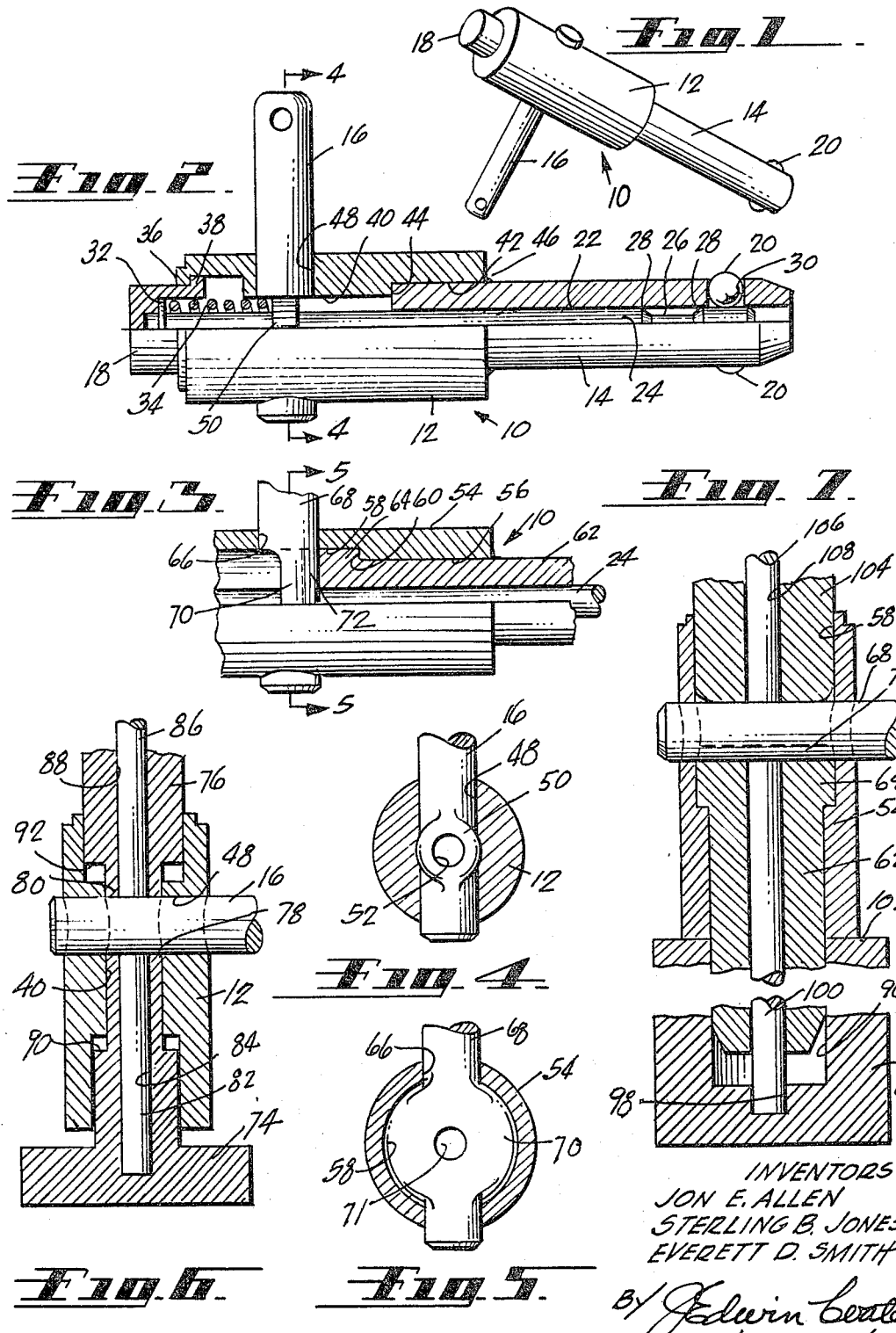
INVENTORS
JON E. ALLEN
STERLING B. JONES
EVERETT D. SMITH
BY *J. Edwin Beale*
—ATTORNEY—

United States Patent Office 3,277,767
Patented Oct. 11, 1966

3,277,767
QUICK RELEASE PIN WITH RIGIDLY
ATTACHED HANDLE
Jon E. Allen, Inglewood, Sterling B. Jones, Torrance, and Everett D. Smith, Lynwood, Calif., assignors to Monogram Industries, Inc., Culver City, Calif.
Filed Aug. 3, 1964, Ser. No. 386,955
1 Claim. (Cl. 85—5)

This invention is in the field of temporary fasteners of a type frequently used in jigs and fixtures and commonly called quick release pins, and is related particularly to a novel construction of such a pin, and method and means for making it.

It is common practice in many industries to use jigs or fixtures including a stationary frame and a second frame movably mounted thereon, as by pivot pins or axles. Various work pieces may be mounted on the movable frame to carry out assembly operations or other work. To make various parts of the work pieces accessible, the frame may be tilted to various positions and temporarily locked therein. The locking is frequently done by inserting a pin in aligned holes in the fixed and movable frame, the holes being so located that the pin takes the locking load in shear.

In some cases the pin is nothing more than a shank and a handle. However, where inadvertent removal might cause injury or damage, a lockable pin is used. Such pin includes an enlarged head and a hollow shank somewhat longer than the thickness of the pieces to be locked. Cross passages are included in the projecting tip of the shank with a locking ball in each. A spindle is longitudinally movable in the hollow shank and has cam portions to urge the balls outwardly beyond the surface of the shank. When they are in this position the shank obviously cannot be withdrawn from the work. When the spindle is moved to release position the balls are free to move back within the contour of the shank to their release position. Normally the spindle is spring urged rearwardly to locking position and may be pushed forwardly for release.

The quick release pins which are presently available are quite satisfactory in their manner of operation but generally are not sturdy enough for the abuse they receive, and have a rather high mortality rate. One of the widely used pins of this class has a cast aluminum head or body with an integrally cast handle. The steel shank is inserted in a short bore in the fore end of the head and is flanged over inside the head to hold them in assembled relation. Slight misalignment of the holes in the fixture often make it difficult to insert and remove the pins, and workman frequently hammer on the body or the handle to move the pins. Such treatment loosens the shank in the head and also often results in breakage of the head or the handle. The pins are often dropped on the floor or stepped on, or heavy objects are dropped on them, and many of them are rendered useless by such treatment.

The pin of the present invention overcomes these difficulties by utilizing materials and arrangements of parts which make it extremely rugged while at the same time simplifying manufacturing procedures and reducing the cost of fabrication. It incorporates the standard functional features of present day pins so it can be used in the same way. At the same time its bulk is somewhat reduced, thus facilitating use in cramped quarters.

The main body, or head, is made of high quality steel. Although shape is optional, it is preferably generally cylindrical and has a stepped cylindrical passage extending longitudinally throughout its length. In one form, the fore end of the passage is a counterbore of substantial depth and the aft end of the hollow shank fits closely in the counterbore and is seated against the shoulder of the counterbore. The shank is permanently secured or bonded in place by the use of meltable metal; that is, it may be welded or brazed, including the type of brazing known as "sweating."

Instead of forming the head with an integral lateral handle by machining or forging, or welding a handle to it, the hollow head is cross bored to form a lateral passage intersecting the longitudinal passage. A length of rod to serve as the handle is inserted in the lateral passage and extends into and preferably through the longitudinal passage. The handle portion which is located within the longitudinal passage is then swaged to modify its shape and prevent it from being removed through the lateral passage. Thus it effectively becomes integral with the head without the necessity of welding or similar operations. In the presently preferred form it is swaged sufficiently to make it conform at least partially to the cylindrical shape of the longitudinal passage, thus preventing rotation as well as axial movement. A central opening is formed in the handle portion and a spring loaded spindle extends through it and through the guideway in the hollow shank to operate conventional lock balls.

In a modification of the invention, the intermediate and aft portions of the longitudinal passage in the head are larger than the fore portion. The shank is formed with a cylindrical abutment at its aft end and the shank is inserted forwardly through the head, being pressed tightly into the forward portion of the longitudinal passage until the abutment seats on the shoulder formed at the juncture of the passage portions of different diameters. The fit may be made so tight that nothing additional is needed to make the connection permanant. In any event, the lateral passage is formed immediately behind the abutment, and a handle is inserted and swage locked in substantially the same way as in the first embodiment. Since the handle is directly in contact with the abutment, the shank cannot move rearwardly. The abutment may have a trough shaped aft face partially surrounding the handle, which very effectively prevents any rotation of the shank.

To assemble the parts, the handle is inserted in the lateral passage and projects into or through the longitudinal passage. Swaging tools are inserted in the longitudinal passage and moved axially toward each other to flatten the handle portion to the desired degree. In the case of the second embodiment, the shank and its abutment, constitute the major portion of one of the swaging tools.

It will be seen that the present invention overcomes the difficulties encountered with the prior art tools and provides a simple and extremely rugged tool which is easy and inexpensive to manufacture. Various other advantages and features of novelty will become apparent as the description proceeds in conjunction with the accompanying drawing in which:

FIGURE 1 is a perspective view of the completed tool of this invention;

FIGURE 2 is a longitudinal view, partly in section, of one embodiment of the invention;

FIGURE 3 is a fragmentary longitudinal view, partly in section, of another embodiment of the invention;

FIGURE 4 is a sectional view taken on line 4—4 of FIGURE 2;

FIGURE 5 is a sectional view taken on line 5—5 of FIGURE 3;

FIGURE 6 is a sectional view in elevation of tooling for assembling the handle and head of the first embodiment; and FIGURE 7 is a sectional view in elevation of tooling for assembling the handle and head of the second embodiment.

The complete tool 10, as illustrated in FIGURE 1, includes a main body or head 12, a shank 14 for insertion in aligned openings in a fixture or other work to be secured, a handle 16 rigidly secured to the head, and a push button 18 to actuate the spindle, which in turn actuates lock balls 20.

As can be seen in FIGURE 2, the hollow shank 14 provides a guideway 22 which slidingly receives spindle 24. The latter is formed near its fore end with an annular recess 26 connected by cam surfaces 28 to the outer diameter of the spindle. In the position shown, the spindle is retracted to its rearmost position and its full diameter is in line with balls 20, moving them outward in their guides 30 beyond the surface of the shank. In this position they serve as detents or locks to prevent the shank from being inadvertently removed from the work.

The aft portion of the spindle passes through an opening in handle 16 and is provided at its end with an abutment 32 in the form of a snap ring seated in an annular groove, not shown. A coil spring 34 surrounds the spindle and extends between the abutment and handle 16. It is installed under compression to yieldingly urge the spindle rearward at all times. Push button 18 is cup shaped and overlies the aft end of the spindle. It is guided in the opening formed by internal flange 36, which also limits its rearward movement by engagement with flange 38 of the button. Finger pressure on the button moves the spindle forward to align recess 26 with balls 20, which permits them to retract and release the pin for removal from the work.

The head 12, which is preferably though not necessarily cylindrical, is formed with a longitudinal passage of stepped diameters. The intermediate portion 40 is the smallest, and the counterbore 42 forms with it a shoulder 44. The aft end of shank 14 fits snugly in the counterbore and seats against shoulder 44 to provide a predetermined length of the exposed section. The shank is permanently bonded in place by brazing or welding material 46. If desired, brazing material may be "sweated" in between the shank and the wall of the counterbore.

Handle 16 is initially a short length of smooth uniform diameter rod which is inserted in lateral passage 48 and passes into the intermediate portion 40 of the longitudinal passage. While it may pass through only one wall, a stronger and more rigid connection is accomplished in the preferred form shown, in which the lateral passage is formed in opposed walls and the rod passes entirely through the head. Before the shank is attached, opposed swaging means are inserted into opposite ends of passage 40 and moved into engagement with handle portion 50 with sufficient force to flatten it as shown in FIGURE 2, where it has assumed the proportions of a short cylinder or disk coaxial with passage 40. This deformed or modified shape is compatible with passage 40 but incompatible with passage 48. Consequently it is locked against both rotational and axial displacement. Its modified shape is illustrated in FIGURE 4, which also shows the opening 52 formed in portion 50 for passage of spindle 24.

FIGURE 3 illustrates the modified form of the invention in which head 54 is provided at its fore end with a reduced bore 56 and in its intermediate portion with an enlarged counterbore 58, forming between them a shoulder 60. Shank 62 is similar to shank 14 except that it is provided at its aft end with an enlarged cylindrical abutment 64 having substantially the same diameter as counterbore 58. The diameter of the remainder of the shank is such as to fit very tightly into bore 56. In assembly, shank 62 is inserted into the head from the rear, or from the left as seen in FIGURE 3, and is forced into the position shown, with abutment 64 firmly seated against shoulder 60 to form a permanent, practically immovable connection.

A lateral passage 66 is formed in opposed walls of head 54, and handle 68, which is initially a plain rod as in FIGURE 2, is passed through passage 66 so that an intermediate portion 70 lies in counterbore 58. Preferably the aft face of abutment 64 is formed with a trough 72 to partly surround handle 68. Shank 62 and its abutment 64 serve as one swaging tool and another swaging tool is inserted in counterbore 58 from the left as seen in FIGURE 3 and pressed against portion 70 with enough force to deform it to a flat or disk like shape, as also seen in FIGURE 5. The opposite side substantially retains its shape because of support from the abutment. At least part of the margin of portion 70 becomes cylindrical and it will be seen that it cannot be rotated or axially withdrawn. Since the handle is in direct contact with abutment 64, the shank cannot move rearwardly or rotate. Opening 71 is formed in portion 70 for passage of spindle 24.

Simple but effective tooling for the embodiment of FIGURE 2 is illustrated in FIGURE 6. Supporting members 74 and 76 hold the head and handle in assembled relation and also serve as swaging tools. Member 74 is supported on the bed of a conventional double action ram press, not shown, and member 76 is carried by the ram for vertical movement. Faces 78 and 80 are flat. Pin 82 is mounted in bore 84 in member 74 and its upper face is coplanar with face 78. Pin 86 is located in bore 88 in member 76 and is attached to a separate ram for independent action on occasion.

When it is desired to deform portion 50 of the handle 16 to its disk like shape, member 76 and pin 86 are moved downwardly together with their front faces coplanar. As the motion continues, portion 50 flattens out. In order to insure that the disk portion is substantially central of the handle, members 74 and 76 are provided with shoulders 90 and 92 spaced substantially equal distances from the shoulders in member 12 which automatically limit their advance to the desired amount. The ram is now opened, the assembly removed, and pin 82 is removed from bore 84. The assembly is again placed in position and member 76 is lowered into holding contact with portion 50. Pin 86 is now independently lowered and forced entirely through portion 50 to punch out hole 52.

The tooling for the embodiment of FIGURE 3 is illustrated in FIGURE 7. Here the lower supporting member 94 is a simple block having a bore 96 to receive shank 62 and a counterbore 98 to receive pin 100. The lower edge of head 54 rests directly on the upper face 102 of block 94, and shank 62 and abutment 64 serve as a swaging tool. Pin 100 is coplanar with the bottom of the trough 72 and cooperates in the swaging operation.

Upper support member 104 is carried by one of the double action press rams and fits slidingly within counterbore 58 of head 54. Pin 106, carried by the other ram of the press, slides in bore 108 of member 104. To deform portion 70, member 104 and pin 106 are lowered together. Members 54, 62, 64 remain stationary and all of the flattening takes place on the upper side. In the same manner as described above, pin 100 is removed and pin 106 is forced downwardly through portion 70 to punch out hole 71.

To avoid the necessity of removing and replacing the assemblies to carry out the punching process, pins 82 and 100 can be effectively removed by lowering them a short distance sufficient to receive a punched slug. This can be done by making bores 84 and 98 deeper and providing horizontally sliding cams in the bases to lower and raise the pins as desired.

It will be apparent to those skilled in the art that various changes and modifications may be made in the constructions disclosed without departing from the spirit of the invention, and it is intended that all such changes and modifications shall be embraced within the scope of the following claim.

We claim:

A quick release pin comprising:

a head having fore and aft ends and a longitudinal passage extending therethrough;

a shank secured in said passage and extending from the fore end of the head to engage in aligned openings in a plurality of relatively movable elements and to be releasably locked therein;

said shank being hollow to provide a longitudinal guideway therethrough;

a spindle longitudinally slidable in said shank to predetermined positions for locking and releasing said shank;

a lateral passage extending through at least one wall of said head and intersecting the longitudinal passage;

the diameter of said lateral passage being less than the diameter of said longitudinal passage;

a handle extending through said lateral passage and into said longitudinal passage, that portion of said handle located in said longitudinal passage having a modified form compatible with said longitudinal passage and incompatible with said lateral passage to prevent removal of said handle;

an opening formed in the modified portion of said handle in alignment with the guideway in said shank to slidably receive the aft portion of said spindle;

said opening in said modified portion extending completely therethrough with the aft portion of said shank projecting beyond the aft surface of said modified portion;

said shank bearing laterally movable detent means adjacent its free end;

said spindle being movable rearwardly to extend said detent means to locking position and forwardly to release said detent means;

abutment means at the aft end of said spindle;

coil spring means surrounding the aft portion of said spindle and extending under compression between said abutments means and the modified portion of said handle to yieldingly urge said spindle rearwardly toward its locking position; and a cap-like push button overlying said abutment means and said spring means and extending from the aft end of said head for manual operation to actuate said spindle to its release position;

said passages being of substantially annular cross section;

the portion of said handle located in said lateral passage being substantially in the form of a cylinder concentric with the longitudinal axis of said handle;

the portion of said handle located in said longitudinal passage being at least partially flattened to a disk-like shape conforming to the cross sectional shape of said longitudinal passage;

the maximum transverse diameter of said modified portion of said handle being substantially equal to the diameter of said longitudinal passage.

References Cited by the Examiner

UNITED STATES PATENTS

| 1,035,655 | 8/1912 | Swenson | 29—522 |
| 2,898,797 | 8/1959 | Bronstein | 85—5 |
| 3,052,148 | 9/1962 | Price et al. | 85—5 |

CARL W. TOMLIN, *Primary Examiner.*

R. S. BRITTS, *Assistant Examiner.*